No. 619,314. Patented Feb. 14, 1899.
C. W. JONES.
ELECTRICAL HEATER.
(Application filed Feb. 10, 1898.)
(No Model.)
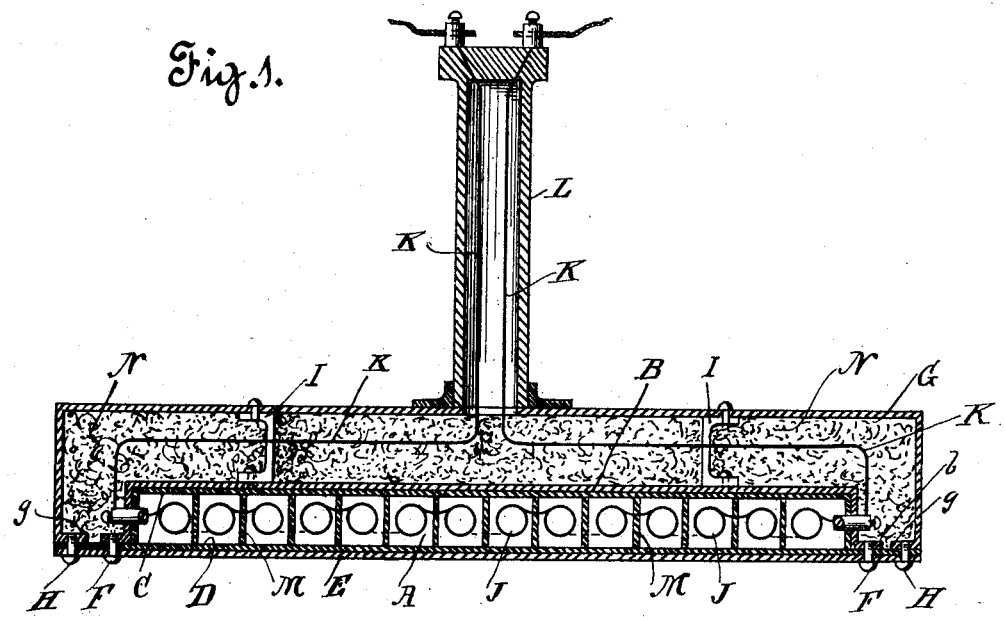
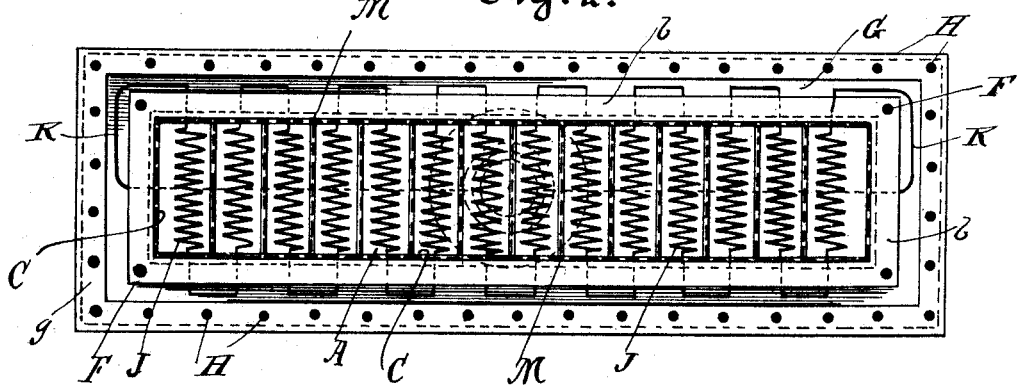
Witnesses.
Inventor.
Charles William Jones,
by Wm. F. Booth,
his Attorney.
THE NORRIS PETERS CO., PHOTO-LITHO., WASHINGTON, D. C.

UNITED STATES PATENT OFFICE.

CHARLES WILLIAM JONES, OF NORTH TEMESCAL, CALIFORNIA, ASSIGNOR OF ONE-HALF TO MILTON M. MARTIN, OF OAKLAND, CALIFORNIA.

ELECTRICAL HEATER.

SPECIFICATION forming part of Letters Patent No. 619,314, dated February 14, 1899.

Application filed February 10, 1898. Serial No. 669,774. (No model.)

*To all whom it may concern:*

Be it known that I, CHARLES WILLIAM JONES, a citizen of the United States, residing at North Temescal, in the county of Alameda and State of California, have invented certain new and useful Improvements in Electrical Heaters; and I do hereby declare the following to be a full, clear, and exact description of the same.

My invention relates to electrical heaters; and it consists of a chamber containing suitable electric heating devices or appliances, such as resistance-coils, and a non-conducting envelop or casing applied to said chamber in such manner as to leave only a portion thereof to the radiation of the heat, whereby the latter is concentrated and directed in a given course or direction only.

It also consists in the novel construction of the heater, which I shall hereinafter fully describe.

The object of my invention is to provide an electrical heater which, while adapted for any use to which such devices are put, is especially adapted and intended for use in thawing frozen ground in frigid climates in order to permit the necessary handling of the earth in mining operations.

Referring to the accompanying drawings, Figure 1 is a longitudinal section of the heater. Fig. 2 is a bottom view of same, the bottom plates of the heating-chamber being removed.

The heating-chamber A is formed of a box B, preferably of metal, lined with a non-conducting material C, such as asbestos or mica or other suitable material, and having a bottom D of asbestos or other non-conducting material. Under the bottom sheet D is a plate E of copper or other conducting material. These are all secured together by screws F or other fastenings, passing through the bottoms E and D and through a flange $b$ of box B.

G is an outer cover or casing formed of metal, wood, or other suitable material. It is secured to the bottoms E and D by the screws H or other fastenings, passing through a flange $g$ of said cover or casing, and said cover or casing is water-tight and forms a water-tight joint with the bottoms, so that all water is excluded from the interior of the heater.

I are brackets secured to the cover or casing and to box B. The object of these brackets is to hold the cover and box together and prevent the latter from dropping down when for any reason the bottoms E and D are removed—as, for example, to reach the contents of the heating-chamber.

Within chamber A are the resistance-coils J, suitably connected and having the circuit-wires K. These latter are properly led in and out, and when the device is used in a sinking-shaft it is well to fit the cover G with an uprising non-conducting tube or housing, such as L, through which to lead the wires and project them.

In order to properly separate the coils J and prevent them from buckling, I place within box B, between adjacent coils, a non-conducting wall M of slate or other suitable material—such, for example, as asbestos-covered metal.

The cover or casing G is filled in the space between it and the box and the bottom plates with a suitable non-conductor of heat, represented by N. This may be mineral wool or other packing used for such purposes.

The electric current being passed through the coils J, said coils are highly heated, and the heat thus generated being prevented by reason of the non-conducting coverings or envelop from radiating freely will be felt only in one direction—namely, downwardly—and will thus heat the bottom plate E, and all its energy will thus be directed. Now by locating the device properly its heated bottom may be taken advantage of—as, for example, in the particular use to which it is intended to be applied—namely, to thaw frozen ground. In this use it is placed upon the ground, and when the earth under and in its vicinity is sufficiently thawed it is removed from that spot and the ground may then be worked in the usual manner of mining operations in frigid climes. As the shaft deepens the heater is lowered accordingly. The interior parts of the heating-chamber and of the cover or casing may readily be reached for renewal or repairs by simply removing the bottom sheets or plates. The cover or casing G being water-tight, the heater is fully protected and may even be located under water.

Having thus described my invention, what I claim as new, and desire to secure by Letters Patent, is—

1. An electric heater comprising a bottom plate, a bottomless box secured centrally to said bottom plate whereby portions of the plate project laterally beyond the box on the four sides thereof, a casing of greater horizontal and vertical dimensions than said box surrounding the same and secured to the bottom plate whereby a space is left between the box and casing at the sides and top of the box, a non-heat-conducting material in said space between the box and casing, electric heating devices in said box provided with electrical connections, and insulating means between said box and bottom plate, substantially as described.

2. An electric heater comprising a bottom plate, a bottomless box having base-flanges $b$ on its sides and secured centrally on said bottom plate whereby the plate projects laterally beyond the box on the four sides thereof, a casing of greater horizontal and vertical dimensions than the box and substantially the breadth and width of said plate surrounding said box and secured detachably to said bottom plate by means of flanges $g$ on the casing sides, whereby a space is left between the box and casing at the sides and top of the box, non-heat-conducting material in said space between the box and casing, spacing-brackets secured to the box and casing, electric heating devices in said box provided with electric connections, and suitable insulation, substantially as described.

In witness whereof I have hereunto set my hand.

CHARLES WILLIAM JONES.

Witnesses:
D. B. RICHARDS,
WALTER F. VANE.